(12) United States Patent
Naylor et al.

(10) Patent No.: US 10,664,124 B2
(45) Date of Patent: May 26, 2020

(54) AUTOMATIC CONFIGURATION OF SCREEN SETTINGS WITH MULTIPLE MONITORS

(71) Applicant: INTERNATIONAL BUSINESS MACHINES CORPORATION, Armonk, NY (US)

(72) Inventors: Alexander J. Naylor, Newbury (GB); Klajd Karaj, London (GB); Thomas Li, Winchester (GB); Grace Jansen, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 16/005,810

(22) Filed: Jun. 12, 2018

(65) Prior Publication Data

US 2019/0377472 A1 Dec. 12, 2019

(51) Int. Cl.
*G06F 3/0481* (2013.01)
*G06F 3/14* (2006.01)

(52) U.S. Cl.
CPC ........ *G06F 3/04812* (2013.01); *G06F 3/1423* (2013.01)

(58) Field of Classification Search
None
See application file for complete search history.

(56) References Cited

U.S. PATENT DOCUMENTS

2006/0033712 A1* 2/2006 Baudisch ................ G06F 3/038
345/157

2013/0113703 A1* 5/2013 Zheng ..................... G06F 3/038
345/157

(Continued)

FOREIGN PATENT DOCUMENTS

| CN | 101149673 A | 3/2008 |
| CN | 104615282 B | 9/2017 |
| JP | 2015082270 A | 4/2015 |

OTHER PUBLICATIONS

Dhdolan.spamkilla, "Automatically determine monitor size?", http://compgroups.net/comp.soft-sys.matlab/automatically-determine-monitor-size/1236126, Posted on Jul. 2, 2012, Printed on Jun. 5, 2018, pp. 1-9.

(Continued)

*Primary Examiner* — Sepehr Azari
(74) *Attorney, Agent, or Firm* — Anthony M. Pallone

(57) ABSTRACT

A method for monitoring cursor motion between multiple monitors that together form an extended display. The cursor's location and speed are tracked. When it is detected that the cursor has intersected a display edge, the cursor is permitted to transit to the next display only if the cursor speed is above a threshold value. Otherwise the cursor is constrained within the monitor where it is located. This makes it easier for a user to actuate buttons and icons that are located near screen edges. Moreover, if the cursor is predicted to be transiting into a display area where there is no additional monitor, then the stored physical location of the additional monitor's display area is displaced so that it lies in the predicted path of the cursor. Manual configuration of the relative physical locations of monitors is therefore unnecessary as the computer learns this automatically from user-driven cursor movements.

18 Claims, 11 Drawing Sheets

(56) References Cited

U.S. PATENT DOCUMENTS

| | | | |
|---|---|---|---|
| 2015/0035749 A1* | 2/2015 | Nakagawa | G06F 3/1423 |
| | | | 345/157 |
| 2016/0162243 A1* | 6/2016 | Neisler | G09G 5/08 |
| | | | 345/163 |
| 2017/0255232 A1 | 9/2017 | Ram | |
| 2017/0351471 A1* | 12/2017 | Passeri | G06F 3/033 |

OTHER PUBLICATIONS

Gordon, "Fix the 'Cursor Drift' Annoyance on Dual Monitors by Tweaking One Simple Setting," Lifehacker.com, https://lifehacker.com/5905846/fix-the-cursor-drift-annoyance-on-dual-monitors-by-tweaking-one-simple-setting, Posted on Apr. 27, 2012, Printed on Jun. 5, 2018, pp. 1-2.

Disclosed Anonymously, "A Method and Apparatus for Automated Placement & Configuration of System Monitors in Cloud Environments," IPCOM000222358D, IP.com Electronic Publication Date: Sep. 26, 2012, pp. 1-4.

Mell et al., "The NIST Definition of Cloud Computing," National Institute of Standards and Technology, U.S. Department of Commerce, Special Publication 800-145, Sep. 2011, pp. 1-7.

Johnston, "How to Add a Second Monitor in Windows," Lifewire, https://www.lifewire.com/add-a-second-monitor-2640288, Updated on Jan. 25, 2018, Printed on Jan. 29, 2018, pp. 1-5.

* cited by examiner

AUTOMATIC CONFIGURATION OF SCREEN SETTINGS WITH MULTIPLE MONITORS

BACKGROUND

The present disclosure relates generally to personal computers and more specifically to the automated configuration of screen settings when the personal computer is using two or more monitors.

It is common for a user of a personal computer to use multiple monitors. For example, a second monitor may be connected to a laptop computer for general office use. Moreover, in a hospital network and other specialist situations, it is common to use two or three monitors arranged on a desk side-by-side. When using multiple screens, the user wishes that the cursor moves seamlessly between monitors under the control of the user's mouse or other pointing device as if the monitors formed a single screen. Examples of other pointing devices are touchpad, joystick, track ball, pen tablet and user eye motion tracker. What the operating system needs to know is the relative physical positions of the different monitors, e.g. is the second monitor to the left or to the right of the first monitor, so that the cursor can be moved appropriately between screens, rather than disappearing off screen in one direction or appearing on the 'wrong' side of an adjacent screen.

In a standard personal computer running an operating system such as for example Windows 10 or Mac OS X (registered trademarks), when an external monitor is connected to the personal computer, the user has to go into display settings and manually configure them to specify the relative physical positions of the external monitor in relation to the personal computer's monitor. This takes time and sometimes results in incorrect settings being applied. One example of incorrect settings with a standard operating system is that, if a laptop user is not always using the same fixed docking station, e.g. a person is hot desking, then the display settings previously set for multiple monitors will be applied, but may be incorrect, since the display settings will assume that the laptop is arranged on the desk in its previous position, e.g. to the left or right of, or below or above, the external monitor. This means that the previous manually configured screen positioning may not be correct for the new situation.

This problem is well known, and there are various known solutions.

CN104615282B uses monitors that are fitted with infrared emitters and receivers that sense the proximity and orientation of neighboring monitors, so that mouse-driven cursor motion between monitors can be appropriately controlled.

CN101149673B uses ultrasonic wireless transceivers placed at the corner of each monitor to detect the relative position of neighboring monitors and their orientation.

JP2015082270A discloses that an "object coordinate value detection unit" is used to detect where a cursor is positioned in one monitor in relation to an adjacent monitor, e.g. whether at say the left-hand edge of one monitor there is another monitor to the left, or no adjacent monitor so that the left-hand edge is the left-hand edge of the combined set of monitors. There appears to be no explanation of what this "detection unit" should be other than that it is part of a control unit that is "mainly configured" by the computer's central processing unit and graphics card.

US2016/162243A1 discloses two different solutions. A first solution in US2016/162243A1 is specific to monitors which have their own webcams, e.g. inbuilt webcams. The user holds a reference object in front of the monitors which is thus in view of both webcams. The computer can then detect the relative physical positioning of the monitors on the basis of parallax between the respective webcam images of the reference object. This information is then used to configure the display settings. A second solution in US2016/162243A1 is to make the user perform a cursor movement when a second monitor is connected. Namely, when a second monitor is connected to a personal computer, a point target is displayed on the newly connected second monitor. The user is then prompted to move the cursor, which is initially located on the original monitor, in a line towards the target. From the direction of this line, and specifically which of the four edges (top, bottom, left or right) the cursor hits on the original monitor, the software can infer the relative physical location of the second monitor. This second solution of US2016/162243A1 thus differs from the previously mentioned prior art solutions, since the former are all based on hardware, whereas the second solution of US2016/162243A1 is a software-based solution that can be universally applied regardless of the hardware available. Nevertheless, this solution is not ideal. Although it avoids the need for the user to manually change the display settings in the operating system, it still requires the user to perform a training action.

Another problem when using dual monitors, which is also known, is that minimizing, closing, or reducing the size of a full screen window requires that the user moves the cursor close to the edge of the monitor's display. If the user has two monitors arranged side by side, then the cursor will tend to leave the monitor with the full-size window which is to be manipulated, rather than being constrained to stay within the monitor. Consequently, cursor-actuated GUI actions around an edge of a full-screen window on one monitor become quite fiddly when the relevant edge is adjacent another monitor. One solution to this problem proposed by Whitson Gordon on 27 Apr. 2012 on the lifehacker.com website in an article entitled "Fix the "cursor drift" annoyance on dual monitors by tweaking one simple setting" is to define one of two side-by-side monitors as being slightly higher than the other in the display settings, so that the operating system is tricked into believing that the top corner where the window actuation controls are situated when a window is maximized is not adjacent the second monitor. This then stops the cursor in the virtually higher monitor, when positioned at the top corner, from being able to drift into the adjacent, virtually lower monitor.

What is needed is a solution to these problems which is universally applicable, i.e. has no additional hardware requirement and does not require any actions by the user, whether they be to go into display settings and make a configuration change or to perform some training action with the cursor.

BRIEF SUMMARY

An embodiment of the invention may include a method, computer program product, and system for controlling a display cursor in a computer connected at least to a first monitor and a second monitor having respective first and second display screens and display areas, whose respective display areas are bounded by edges. The first and second monitors being configured in display settings of the computer to provide an extended display. The embodiment may include displaying a cursor on the first display screen, the cursor being under control of a user-controllable pointing device communicatively connected to the computer. The embodiment may include sensing cursor location and speed of travel of the cursor within the first display area. The embodiment may include detecting if the sensed cursor location is moved to intersect an edge of the first display area. The embodiment may include permitting the cursor to exit the first display area and enter the second display area conditional on the sensed cursor speed being above a threshold speed when the intersection occurred.

The above described embodiment thus controls cursor motion between multiple monitors that together form an extended display by tracking the cursor's location and speed. When it is detected that the cursor has intersected a display edge, the cursor is permitted to transit to the next display only if the cursor speed is above a threshold speed. Otherwise the cursor is constrained within the monitor where it is located. This makes it easier for a user to actuate buttons and icons that are located near screen edges. It will be understood that the display areas will in most cases be rectangular so that the edges will follow straight lines, i.e. be linear.

The above described embodiment can also be extended to automatically manage the computer's display settings for the physical locations of the first, second and any further display areas relative to each other.

When it is detected that the sensed cursor location has moved to intersect an edge of the first display area with a sensed cursor speed above the threshold speed, the embodiment may further include computing a predicted path for the cursor after it exits the first display area, e.g. based on the cursor's path within the first display area prior to the intersection and/or on the cursor's path after it exits the first display area according to output of the pointing device. If it is determined that the predicted path does not intersect with the second display area according to the second display area's stored physical location, then the second display area's stored physical location is displaced such that the predicted path intersects with the second display area. This measure provides for coarse adjustment of the stored location to match the physical location to avoid gross errors. Namely, if the cursor is predicted to be transiting into a display area where an additional monitor does not exist, then the stored physical location of the additional monitor's display area, or one of them in case there are two or more additional monitors, is displaced so that it lies in the predicted path of the cursor. This means that the computer does not need manual configuration as to the relative physical location of additional monitors, but rather learns this automatically from the user-driven cursor movements. The embodiment is scalable to any number of displays.

On the other hand, if it is determined that the predicted path does intersect the second display area according to the second display area's stored physical location, then the second display area's stored physical location can be displaced in a direction of the intersected edge by an amount derived from a deviation between the predicted path and an actual path of the cursor in the second display area in the direction of the intersected edge. The amount may be taken from the current event, or may take account multiple recent events through using a weighted sum that includes not only the deviation from the predicted path which is currently being considered, but also similar deviations from previous predicted paths, where the weighting is in favor of more recent above-threshold-speed edge intersections. This measure provides for fine adjustment of the stored location to match the physical location by tracking cursor motion to deduce the size of misalignments between the stored and actual locations of adjacent display areas in the direction of the edge being traversed.

In various embodiments, the threshold speed is not the same for all edges and in all circumstances, but has a value that varies. The value may for example be varied according to the edge being intersected; according to which portion of an edge is being intersected; and/or according to at least one of: past user motions of the cursor with the pointing device; pointing device settings; and current applications running on the computer.

According to another aspect of the disclosure, there is provided a computer program product stored on a computer readable medium and loadable into the internal memory of a computing device, comprising software code portions, when said program is run on a computing device, for performing the above-defined embodiment. A computer program product may also be provided which stores the above-mentioned computer program. The computer program when executed may constitute a background process, e.g. at operating system level, that automatically controls cursor movement and display area physical locations based on user input to a pointing device.

According to another aspect of the disclosure, there is provided a computer system configured to enable control of a display cursor when the computer is connected at least to a first monitor and a second monitor having respective first and second display screens, whose respective display areas are bounded by edges, the first and second monitors being configured in display settings of the computer to provide an extended display, the computer being configured to perform the above described embodiments.

BRIEF DESCRIPTION OF THE DRAWINGS

In the following, the present invention will further be described by way of example only with reference to exemplary embodiments illustrated in the figures.

DETAILED DESCRIPTION

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Figure 1:
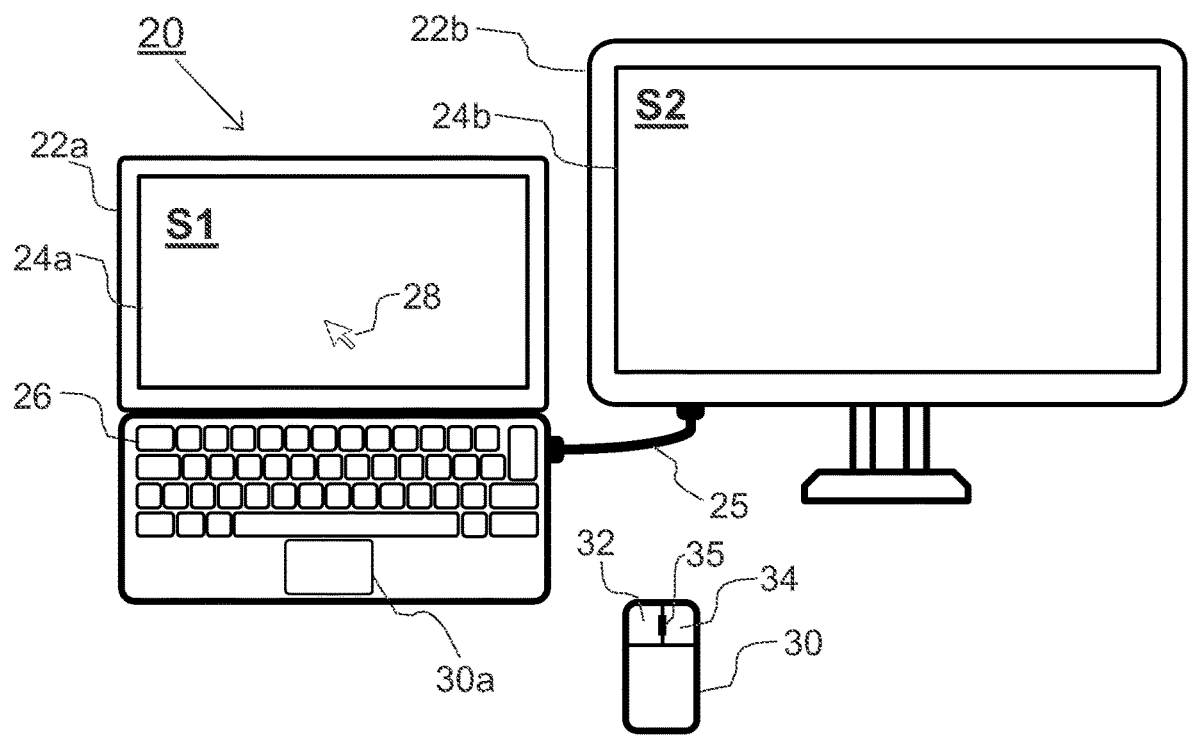
FIG. 1 shows a laptop computer with an external monitor; embodiments of the disclosure may be installed and performed by the laptop computer, in accordance with an embodiment of the present invention.

FIG. 1 shows a laptop computer 20 with an inbuilt monitor 22a housing a display screen 24a. The laptop computer 20 is connected via a cable 25 to an external monitor 22b housing a display screen 24b. The computer has an operating system which incorporates support for a graphical user interface (GUI) that includes display of a cursor 28 on the display screen or screens that are available. The cursor's position and motion is controllable by a user-driven I/O device, which we generically refer to as a pointing device. The cursor 28 is illustrated in the form of an arrow icon, but of course may take a variety of forms. The computer 20 is also connected to a pointing device in the form of a mouse 30 including a left button 32, a right button 34 and a scroll wheel 35. Of course, further buttons and input elements may also be included, such as in a mouse designed or configured for gaming or other specific application types. The computer 20 also has an inbuilt pointing device in the form of a trackpad 30a. The computer 20 further comprises an inbuilt keyboard 26. The keyboard 26, mouse 30 and trackpad 30a are examples of I/O devices. By I/O device we mean a device that is communicatively connected to control elements of the computer, such as its central processing unit (CPU) or graphics processing unit (GPU). In the case that the laptop display 24a includes an overlaid touch sensor, then the touch sensor will constitute a further I/O device, which can also function as a pointing device. The keyboard 26 includes a plurality of keys, e.g. following a standard QWERTY layout and space bar, with other standard keys such as ENTER, CAPS LOCK, ALT, CTRL, FN and so forth also being provided.

As is standard, the two monitors 22a, 22b are configurable in display settings of the computer to provide either of two display modes. In one mode, the external monitor 22b is configured to duplicate whatever is displayed on the inbuilt laptop monitor 22a. The present disclosure is not concerned with the duplicate screen mode so this mode is not further mentioned. In the extended display mode, which is the subject of the present disclosure, the two monitors 22a, 22b are configured as a unified extended display. In the following, we assume the computer is in the extended display mode whenever two or more monitors are connected.

Figure 2:
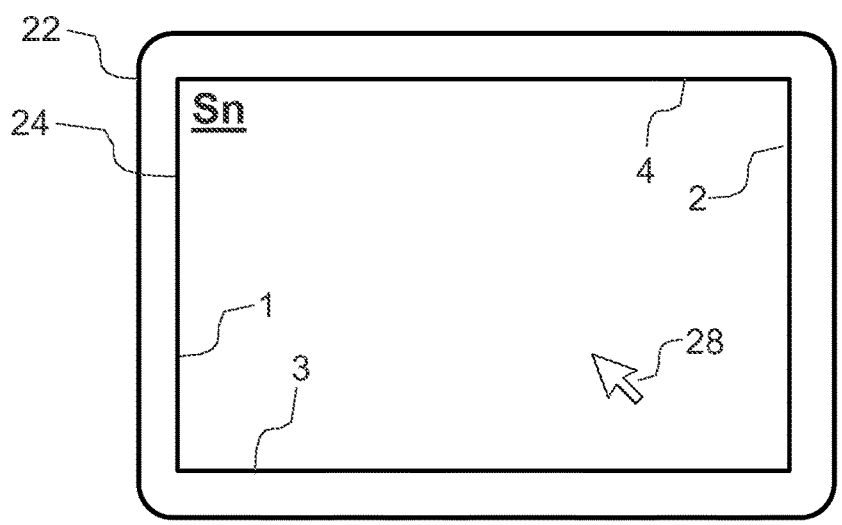
FIG. 2 shows features of a monitor display as used to describe embodiments of the present invention.

FIG. 2 shows a single monitor 22 and display screen 24. The display screen 24 has a rectangular display area S bounded by left, right, bottom and top edges 1, 2, 3, 4. In the following, we label the display areas of the monitors according to the monitor number, S1, S2, S3 etc.

Figure 3:
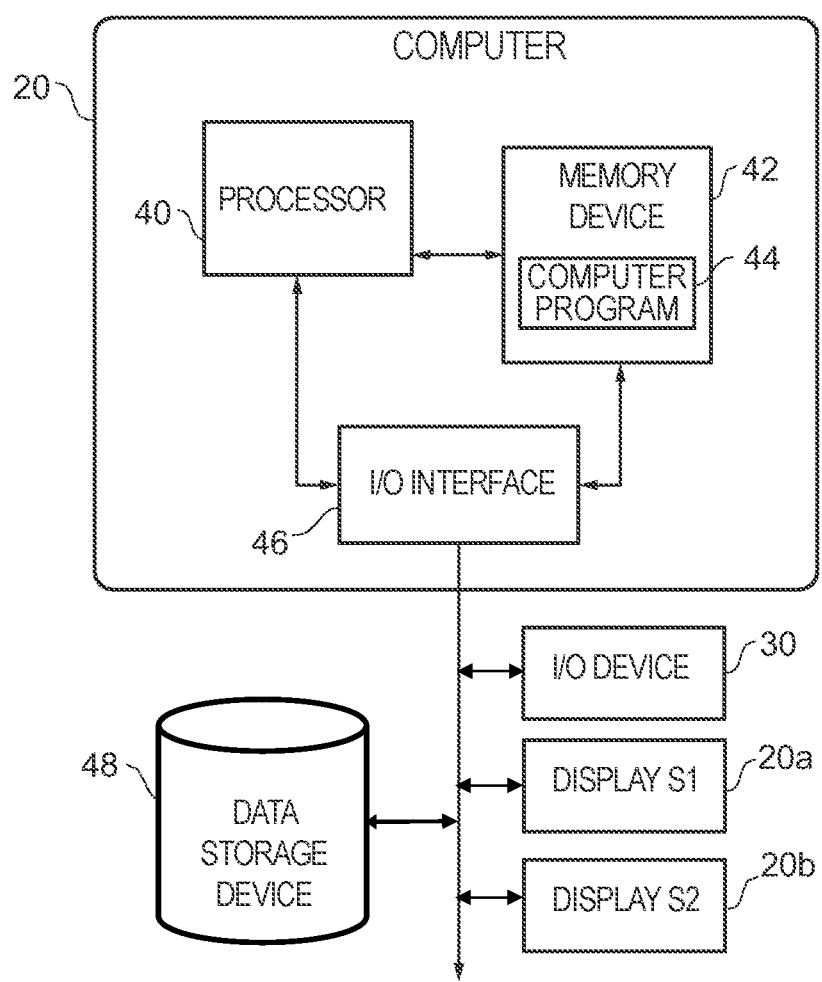
FIG. 3 shows internal structure of the computer of FIG. 1, in accordance with an embodiment of the present invention.

FIG. 3 shows internal structure of the computer 20 of FIG. 1 in a block diagram. The computer 20 comprises a processor 40, e.g. a central processing unit (CPU), to provide a processor resource coupled through one or more I/O interfaces 46 to one or more hardware data storage devices 48 and one or more I/O devices 20a, 20b, 30 etc., some of which are configured to manage graphic object requests, e.g. relating to cursor control, and the display(s) 20a, 20b on which graphics objects are displayed. The processor 40 may also be connected to one or more memory devices 42. At least one memory device 42 to provide a memory resource contains a stored computer program 44, which is a computer program that comprises computer-executable instructions. The data storage devices 48 may store the computer program 44. The computer program 44 stored in the storage devices 48 is configured to be executed by processor 40 via the memory devices 42. The processor 40 executes the stored computer program 44.

Figure 4:
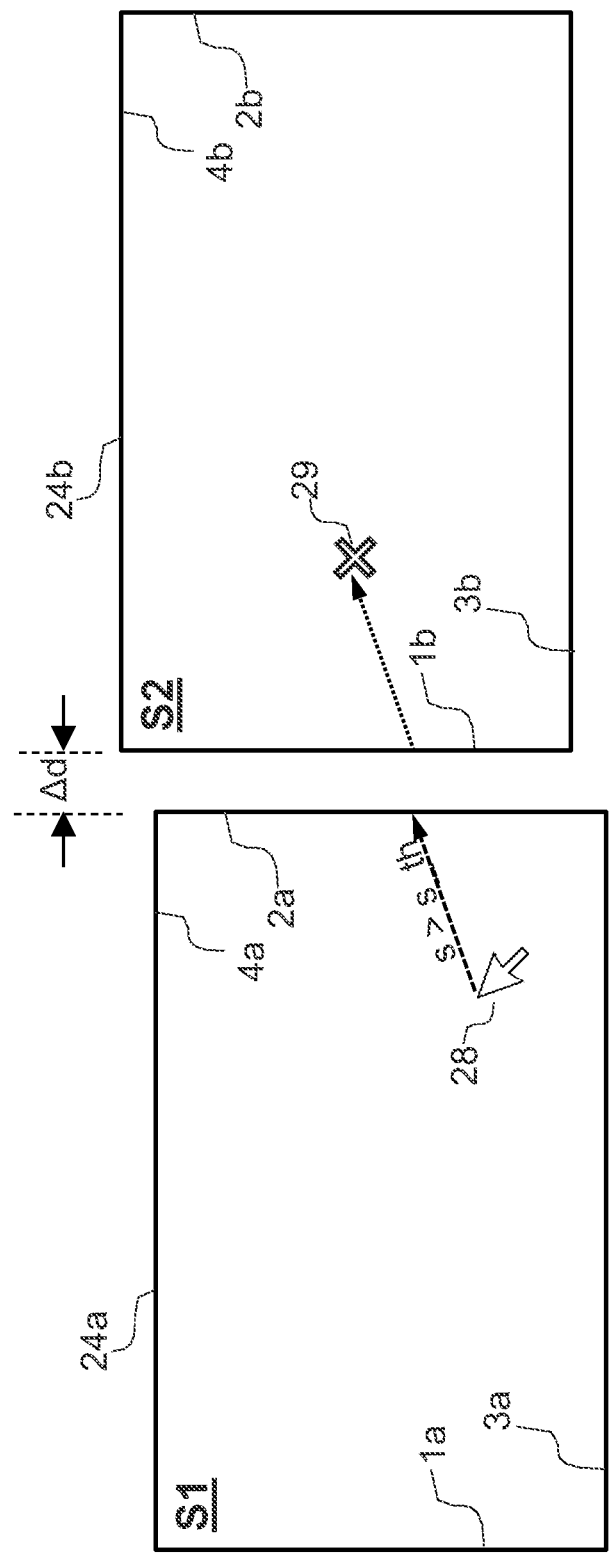
FIG. 4 shows display areas S1, S2 of two display screens when a cursor is moved from display area S1 to display area S2 when the display screens are operating as an extended display, in accordance with an embodiment of the present invention.

FIG. 4 shows first and second display screens 24a, 24b with respective first and second display areas S1, S2. The cursor 28 is movable between display screens. For example, as illustrated, the cursor 28 when located in display area S1 may be moved to a point 29, marked with an 'X' in display area S2. In a conventional operating system configuration, the cursor 28 is freely movable between the display areas. However, according to the present disclosure, restrictions are placed on when the cursor is allowed to leave the display area where it is currently located. Namely, the cursor is only permitted to exit its current display area if it is moving fast enough. To enable this restriction, the operating system is configured to sense and monitor location and speed of travel of the cursor within the display area where it is currently located. When the operating system detects that the sensed cursor location has been moved to intersect a display edge, e.g. in FIG. 4 the right-hand edge 2a of display area S1, then the operating system compares the sensed cursor speed, s, with a threshold speed value, $s_{th}$, and only permits the cursor to exit its current display area when the sensed cursor speed is above this threshold, $s>s_{th}$. The cursor 28 can thus only exit one display area and enter a neighboring one conditional on the sensed cursor speed being above a threshold speed when the intersection occurred.

If desired, the sensed cursor speed must not only be above a threshold speed, but also below an upper limit or maximum speed. This optional additional measure will guard against situations in which the cursor-controlling pointing device is not properly under user control and so may help weed out uncontrolled rapid movement of the pointing device that is deemed to be too fast to make it likely that the pointing device is truly under user control.

The speed measure may be simply the absolute value of the cursor's velocity or may be the component of velocity perpendicular to the display edge that is intersected. The latter should in principle be a superior measure since it is a more faithful indicator of a user's desire to move the cursor to a neighboring screen. For example, it could be envisaged that when the cursor is being moved relatively rapidly, but largely horizontally, close to the top edge of a screen and intersects with the top edge, this is unlikely to mean the user wishes to change screens.

Another option which further restricts the ability to move the cursor between screens is to limit the intersections that are able to cause inter-screen cursor movement to intersections within a subset of the edges of the display areas, e.g. to exclude the bottom edge of the display area, so that only intersections with the left-hand, right-hand and top edges of the display areas are included. In other words, intersections with the bottom edge are ignored.

A still further option is to vary the threshold speed according to one or more of a variety of different parameters which are now discussed. It may be advantageous to vary the value of the threshold speed according to which edge is being intersected. For example, it may be made harder to exit out of the top or bottom edge than the left or right edge by making the threshold value higher for the top and bottom edges than the left and right edges. Another example would be to make the threshold value higher for the left edge than the right edge. This may be advantageous when the operating system or a currently running application has a GUI with user-buttons, tabs etc. on the left-hand edge, so that the pointing device will be frequently moved to close to the left edge, such is the case with the Linux (registered trademark) operating system for example. (It is also possible to configure Microsoft Windows and macOS to have a similar GUI to Linux.) For similar reasons, it may be advantageous to vary the value of the threshold speed according to which portion of an edge is being intersected. In the Windows (registered trademark) operating system, for example, it is expected that users will frequently move the cursor to the top-right display area corner to actuate the buttons that close, resize or minimize full-screen windows. The threshold speed may therefore be increased for the portions of the right edge and the top edge that are near to the top-right corner. This is an example of where the threshold speed may beneficially set to different values for different applications that are currently being displayed. For example, there would not be a need to increase the threshold speed if the user does not currently have an application open with a close button at the top right corner. This may be a common situation, where the user mainly places one active application in a full screen window on the larger screen and other applications in non-full-screen windows on the smaller (laptop) screen, so the smaller screen does not generally have open applications with close buttons at the top right corner.

The threshold speed values may also be set taking account of past user motions of the cursor with the pointing device. That is the thresholds are set in a user-specific way, since some users will move the cursor faster than others, e.g. just by their nature, or by virtue of personal settings regarding sensitivity of the pointing device. Combinations of these parameters may also be significant and therefore also used to adjust thresholds. For example, if a user is repeatedly cut-and-pasting between two application windows open on two display areas, either two instances of the same application or two different applications, then the thresholds can be lowered so as not to inhibit the associated back-and-forth cursor motions. This activity could be recognized automatically based on a combination of recent past user activity, co-running of two applications or two instances of the same application with open windows on two display areas.

Another relevant concept for cursor control according to the present disclosure is now introduced. This is the concept of physical location of each monitor, or more specifically the locations of the monitors relative to each other. The computer, for appropriate control of the cursor between monitor screens, needs to know the relative positions of the monitors, i.e. how they are juxta positioned. The computer therefore stores deemed physical locations for each monitor when multiple monitors are connected. Here we note that physical location will generally be in two-dimensions, it being assumed that the display areas of the different monitors are lying in a common plane. In principle, three dimensions could be used, but this would not be expected to provide any significant benefit.

As described in the introduction, things go wrong when the actual physical locations of the monitors are grossly out of balance with where the computer thinks they are, i.e. the stored (or deemed) physical locations. For example, with a laptop and external monitor as shown in FIG. 1, is the external monitor on the desk arranged to the right of the laptop or to the left? The measures undertaken in an embodiment of the disclosure relating to the monitors' physical locations are now described.

The operating system is configured so that the display settings stores physical locations for each current multiple display area, where these physical locations serve to specify the positions of the display areas relative to each other. When the operating system detects that the sensed cursor location has moved to intersect an edge of its current display area with a sensed cursor speed above the threshold speed as described above, further computations are made in relation to display area physical location.

Namely, the computer computes a predicted path for the cursor after it exits its current display area based on the cursor's path within its current display area prior to the intersection. The relevant time period that is used in the computation will be some time period immediately before the intersection occurred, which we refer to as the past time period further below. A suitable time period is likely to be of the order of tenths or hundredths of seconds, e.g. 0.01, 0.02, 0.03, 0.04, 0.05, 0.06, 0.07, 0.08, 0.09, or 0.10 second±0.005 seconds. The time period may be adjustable manually in the operating system's display settings. Another option would be for the time period to be set interactively based on user behavior, since some users will generally move the cursor faster or slower, and since different pointing devices may move the cursor generally faster or slower (e.g. a pen pointer may be faster, and a mouse slower). Another factor may be the applications being run, since for some applications cursor motions within a screen area will mostly be slower, whereas for other applications they may be faster. A still further factor may be the GUI action being performed, so that different time periods may be set for different GUI actions, such as dragging and dropping.

The predicted path can be determined from the prior path using any one of a variety of known methods for interpolation. A simple solution would be to make a linear interpolation from a tangent of the prior path at the edge intersection. Other solutions would be to use some form of higher order interpolation of the cursor's prior path, e.g. using a spline such as a cubic spline. The length of the predicted path may be fixed by the motion of the pointing device, i.e. end point 29 reflects the cursor position executed by the user when leaving the current display area. Alternatively, the length of the predicted path could be based on an interpolation of speeds prior to the edge intersection, i.e. taking account of acceleration, or just based on a fixed speed such as an average speed of the cursor over a desired pre-intersection time period.

The predicted path after exiting the current screen area is computed for a limited time period after the intersection occurred based on a continuation of the sensed speed, which we now refer to as the future time period in distinction to the past time period mentioned above. This future time period could be set to be the same as the past time period, or have some fixed relation thereto, e.g. be half the past time period. Alternatively, the future time period could be manually set as an independent parameter in the operating system's display settings.

Figure 5:
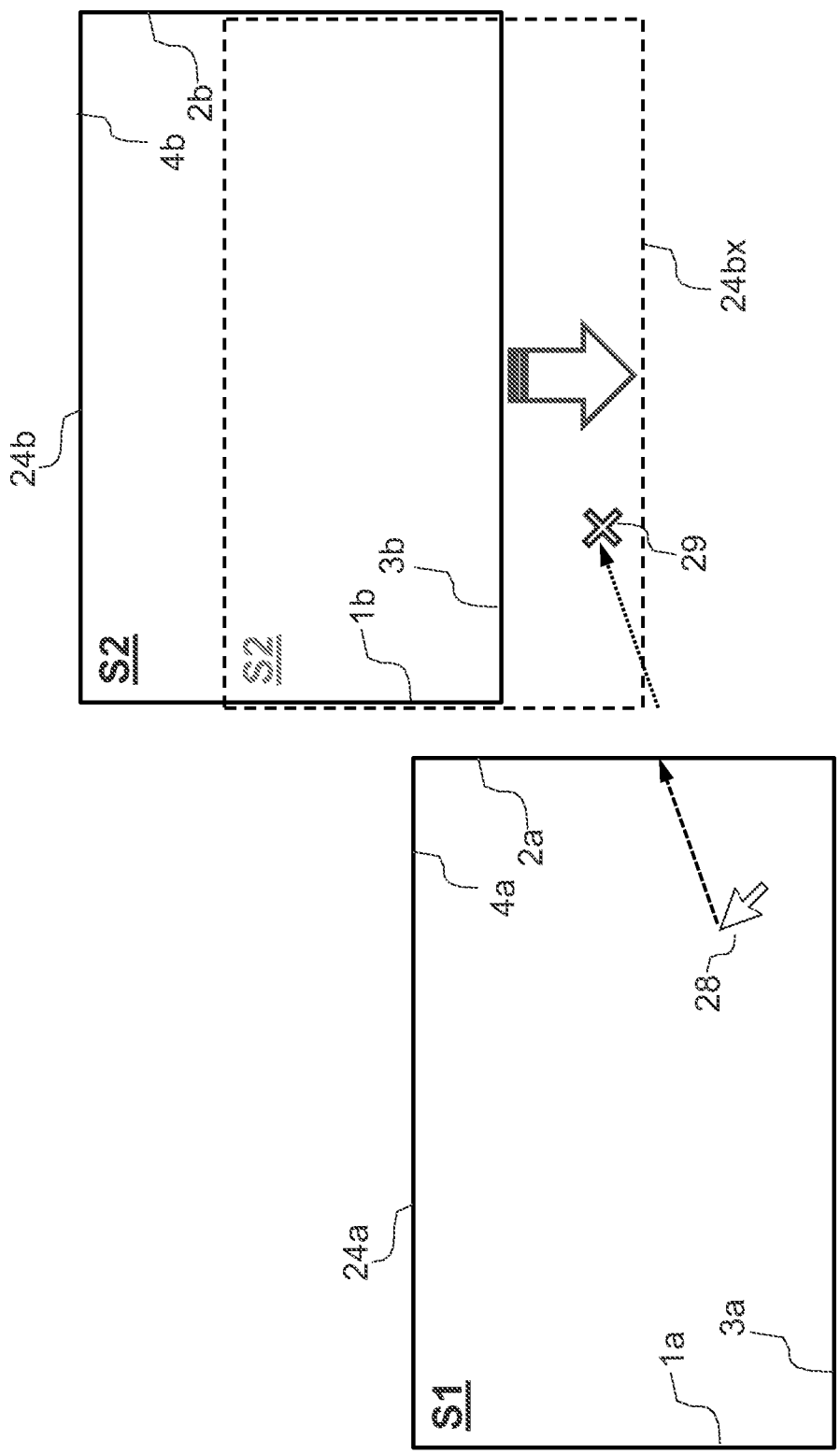
FIG. 5 is similar to FIG. 4, but with the display areas S1, S2 at significantly different heights according to the deemed physical locations for the display areas currently stored by the computer, in accordance with an embodiment of the present invention.

To explain the purpose of computing the predicted path, we compare FIG. 4 with FIG. 5. In both FIG. 4 and FIG. 5, the predicted path is shown with the arrow-headed dotted line, and the prior path within screen S1 with the arrow-headed dashed line.

In FIG. 4, everything is OK, since the predicted path takes the cursor to an actual physical location which is compatible with the deemed physical location of screen S2 in relation to screen S1. That is the predicted path, or at least its end point 29, lies within the display area S2 of the additional monitor according to the operating system's stored, i.e. deemed, physical location of display area S2. This means that the stored physical location for display area S2 has produced a logical outcome consistent with the user's movement of the cursor position.

However, in FIG. 5, things are not OK, since the user's movement of the cursor position, as represented by the predicted path, will take the cursor to an end point 29 that is outside the display area S2. In this case, i.e. if it is determined that the predicted path does not intersect with the display area of another monitor, according to the stored physical location of display area S2, then the operating system changes the stored physical location of display area S2 so the display area S2 is moved, i.e. displaced, such that the predicted path, or at least its end point 29, lies in the display area S2. An effective constraint in determining the displacement of the other monitor's display area is to change its stored physical location by a distance which is based on a minimum distance required to ensure that the predicted path intersects with the second display area. In FIG. 5, we show the displacement of the display area S2 with the large downward arrow and the dashed outline of the display area S2 labelled 24bx.

Figure 6:
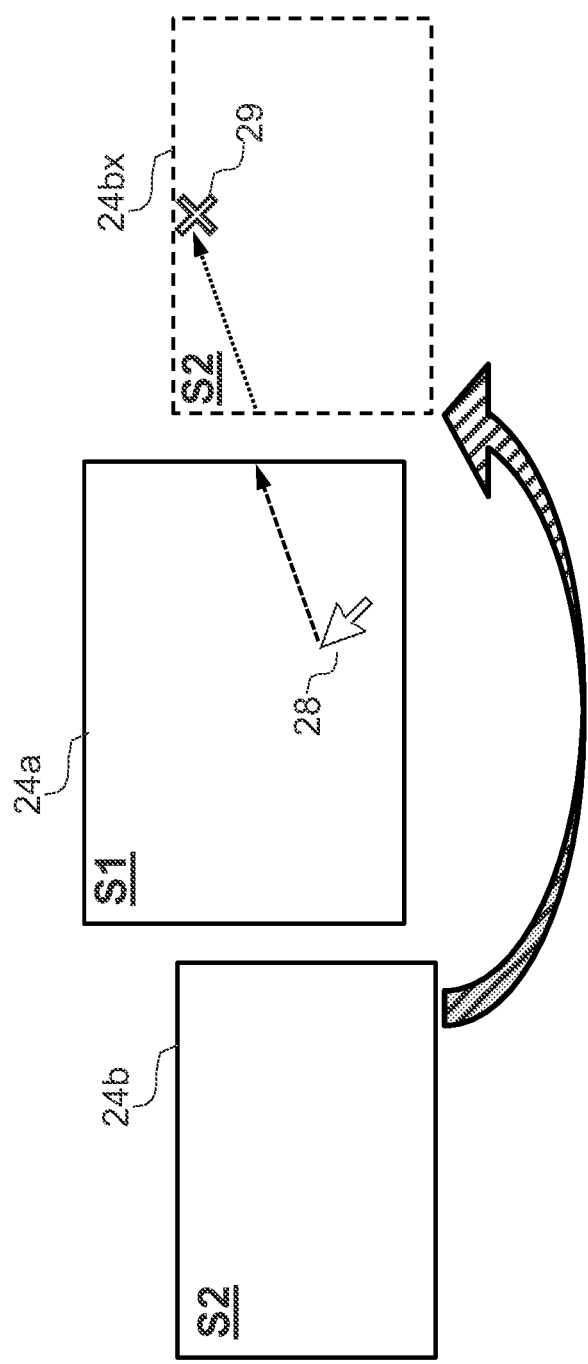
FIG. 6 is another example with two display areas, S1 and S2, when the stored physical location of the second display area S2 is on the opposite side of the first display area S1 compared to its actual physical location, in accordance with an embodiment of the present invention.

FIG. 6 illustrates a grosser error, where the stored physical location of display area S2 is to the left of display area S1 (where left and right are used as viewing the figure) whereas the actual physical location of the display area S2 is to the right of display area S1. Therefore, when the user moves the cursor 28 to the second monitor, the display settings for the physical location are incorrect. The operating system applies the same logic as described above with reference to FIG. 5 and changes the stored physical location of display area S2 by the minimum distance required to ensure that the predicted path intersects with the second display area, this "movement" of the display area S2 being schematically illustrated by the looped arrow and dashed outline 24bx of S2's "new" location.

Referring back to FIG. 4, we discuss the distance Δd, which is the physical separation between display areas S1 and S2 at their adjacent edges 2a, 1b. First, we note that for conventional monitors the stored physical locations of the display areas should generally be set within a constraint that none of the respective display areas is permitted to overlap. This simply reflects the fact that a user will not place one monitor partly behind another, since then it would be partly obscured. However, of course most monitors will have a significant bezel, and in any case users will not generally arrange monitors so that they are abutted, but rather will leave some free space between adjacent monitors. Since it would be confusing for the user if a cursor disappeared from view when transiting between display areas, regardless of the physical gap Δd between adjacent display areas, the stored physical locations effectively set Δd=0, i.e. so that adjacent display areas abut. On the one hand, this prevents the cursor disappearing between display areas and, on the other hand, is based on the assumption that monitors, and hence their display areas, do not obscure each other.

Figure 7:
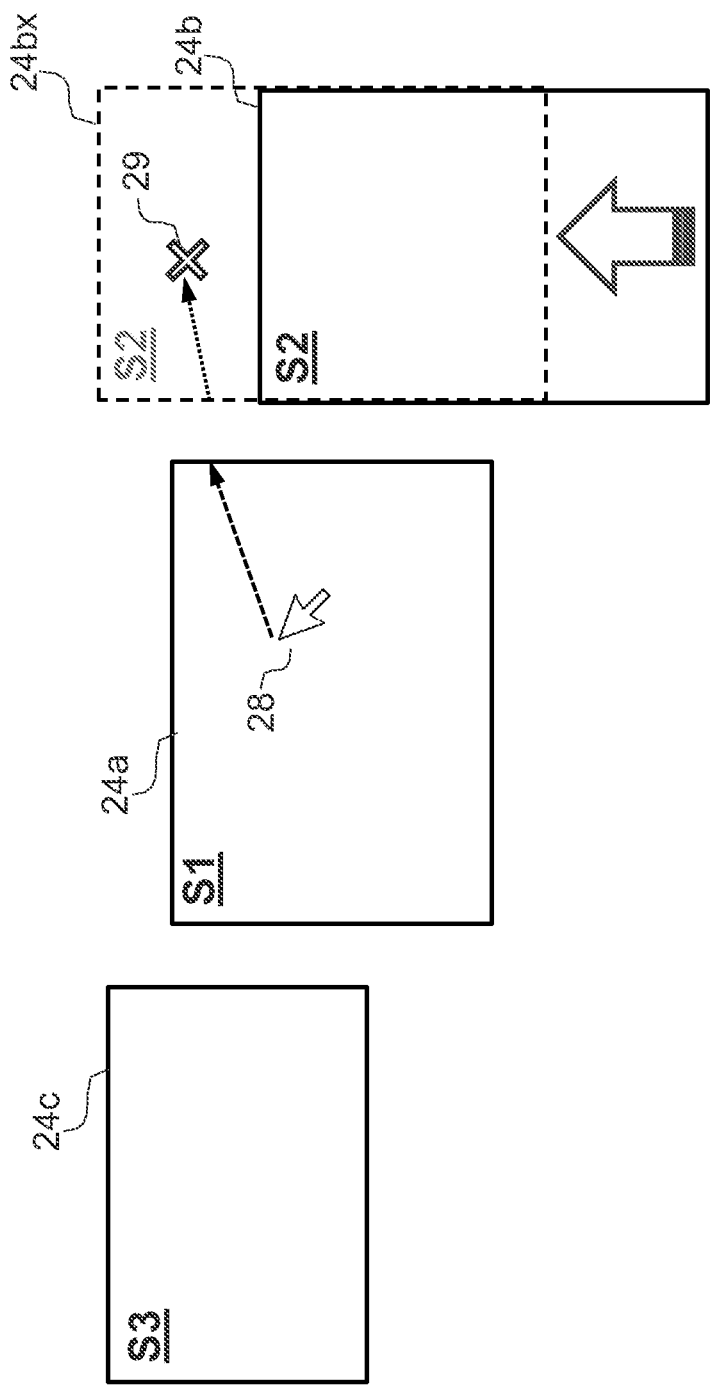
FIG. 7 is an example with three monitors and associated display areas S1, S2, and S3, in accordance with an embodiment of the present invention.

FIG. 7 shows an arrangement where three monitors with respective display screens 24a, 24b, 24c are provided, their screen areas being labelled S1, S2, S3. In the example shown in FIG. 7, the user has moved the cursor outside its current display area S1 into an area that does not coincide with either of the other display areas S2, S3, according to their stored physical locations. Here there is an additional aspect to the logic to be applied, namely which of the other monitors should be selected for displacement of their display area. That is, should display area S2 or S3 be displaced to encompass the predicted path? The logic we adopt in the situation where there are multiple candidate display areas for displacement, is that if it is determined that the predicted path intersects neither with the second display area S2 nor with the third display area S3 according to their respective stored physical locations, then we select one of the candidate display areas for moving based on which of them requires a smaller displacement to ensure that the predicted path intersects with its display area. In the example of FIG. 7, it is evident that moving display area S2 satisfies this criterion, so this is what is done as shown by the arrow and dashed line destination position of display area S2.

We also note that a further constraint that may be applied when computing how to displace the physical locations of display screens is to restrict them to ensure that the display areas are situated in particular known, favored, or pre-set juxtapositions, thereby excluding some possible juxtapositions.

Another refinement in situations where it is possible to move the display area of the secondary screen between positions to the left, right, above and below the display area of the primary screen, is to impose an additional condition when the change would be from left or right to above or below. This additional condition is to permit this movement if and only if the projected cursor movement is above a threshold distance away from the current secondary screen's display area position. In other words, the size of the contemplated movement of the secondary screen's display area would need to be greater than a threshold distance for it to be performed.

A further refinement is to place restrictions on the action of displacing a second, third etc. display area when the cursor is moved out of the current display area in such a way that it does not intersect with any display area of the extended display. This restriction may also be coupled with an associated restriction confining the cursor to its current display area if it is decided not to display another display area to 'catch' the off-display cursor movement. Specifically, a restriction may be introduced by requiring multiple consecutive off-display cursor movements that do not intersect with a display area to take place before a display area displacement is caused. We call these off-display motion events. For example, 2 or 3 such non-intersecting motions may be required.

Figure 8A:
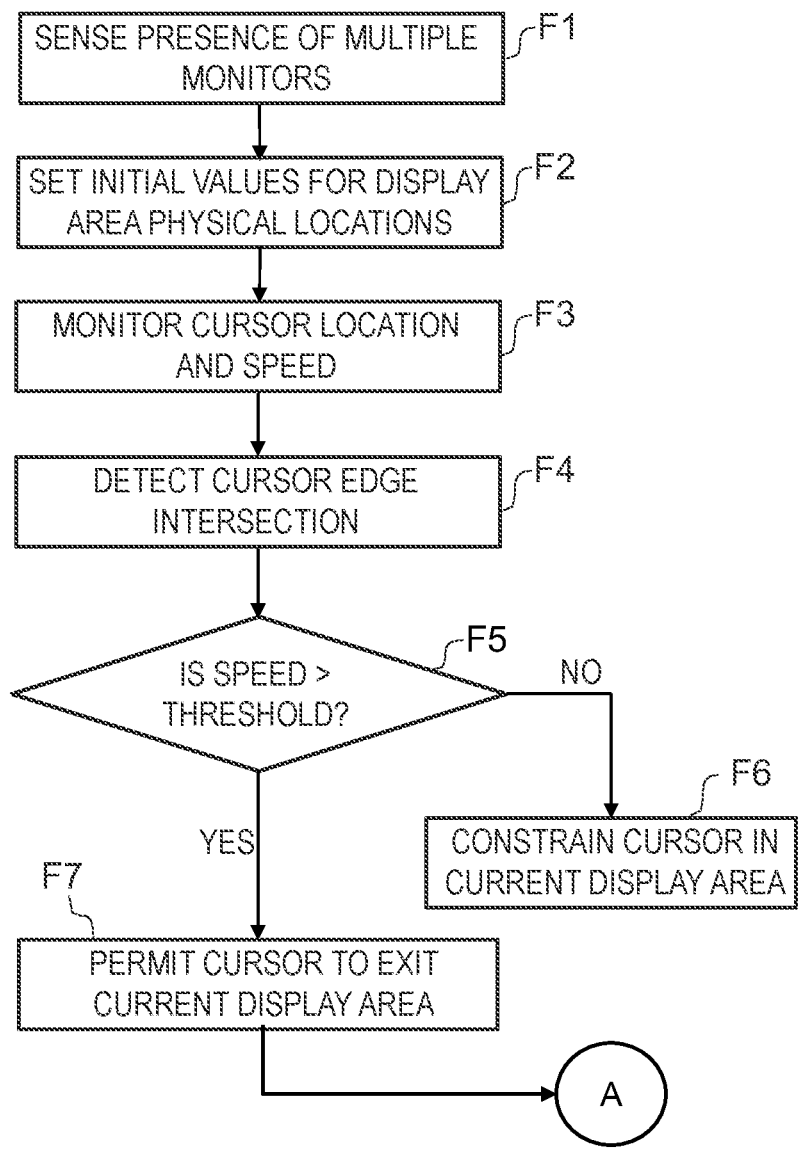
FIGS. 8A and 8B are first and second parts of a flow diagram illustrating the operations of a cursor control algorithm for implementing embodiments of the present invention, in accordance with an embodiment of the present invention.
Figure 8B:
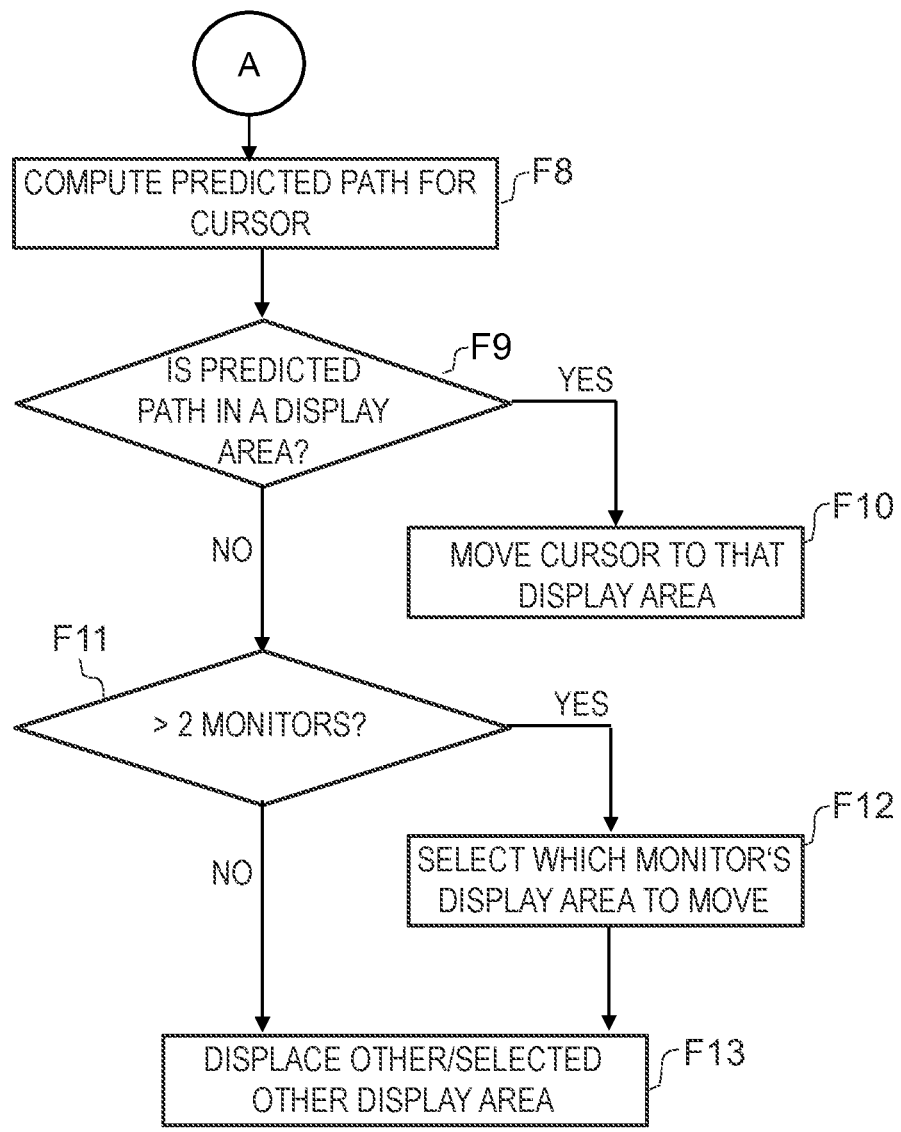

FIGS. 8A and 8B are first and second parts of a flow diagram showing an example of the logical steps carried out by a cursor control algorithm for implementing the measures described above for interpreting user input via a pointing device used to control motion of a cursor on an extended display.

In Step F1, the cursor control algorithm of the computer's operating system senses presence of multiple monitors, each having an associated display area.

In Step F2, the display settings adopt initial values for the physical locations of each display area, of the multiple monitors, relative to each other. These initial values may be taken from the last time multiple monitors were connected, or may be defaults, e.g. with the display areas side-by-side at the same height.

In Step F3, the cursor control algorithm monitors location and speed of travel of the cursor within its current display area.

In Step F4, the cursor control algorithm detects if the sensed cursor location has been moved to intersect a live edge of its current display area, where live edge means a display area edge that is permitted to be crossed by the cursor in order to travel to another display area.

In Step F5, a test is performed to determine if the sensed cursor speed is above a threshold speed (and optionally also below a maximum speed) when the intersection occurred. The cursor speed may be the component of the cursor velocity that is perpendicular to the display area edge that is intersected.

If 'no' in Step F5, then in Step F6 constrain the cursor to remain in its current display area.

If 'yes' in Step F5, then in Step F7 permit the cursor to exit its current display area and enter another display area.

In Step F8, following from Step F7, computing a predicted path for the cursor after it exits its current display area based on the cursor's path within its current display area prior to the intersection.

In Step F9, a test is performed to determine if the predicted path lies within another display area according to the other display area's or areas' stored physical location or locations.

If 'yes' in Step F9, then in Step F10 move the cursor into that other display area according to the predicted path.

If 'no' in Step F9, then in Step F11, check if there are more than two display areas connected to the computer.

If 'yes' in Step F11, then in Step F12 selecting which of the multiple other display areas to move based on which of them requires the smaller or smallest displacement to ensure that the predicted path intersects with its display area.

In Step F13 displacing the other, or the selected other, display area's stored physical location by the minimum amount required to ensure that the predicted path intersects with another display area.

Figure 9:
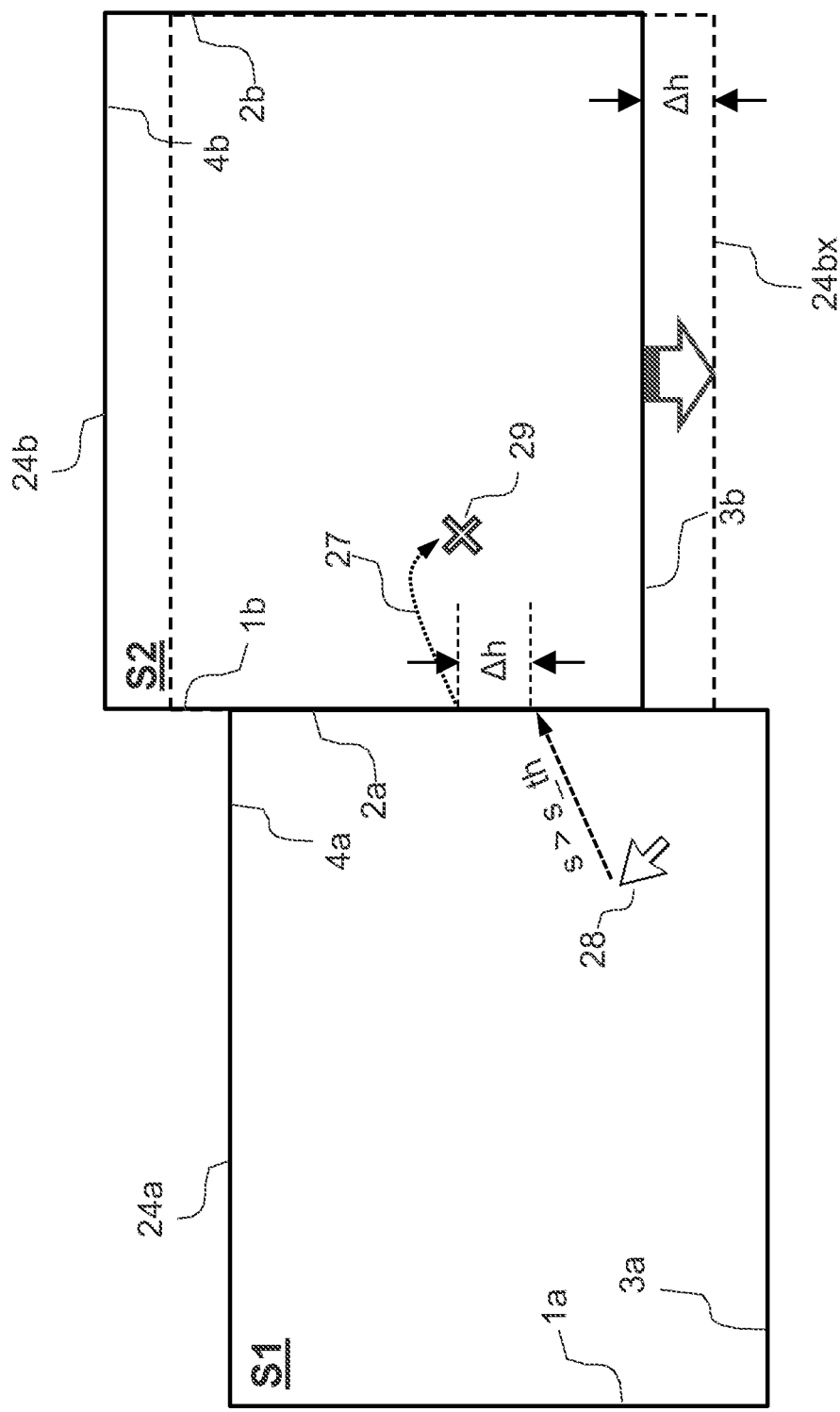
FIG. 9 shows display areas, S1 and S2, of two display screens arranged generally left and right of each other and where the actual location of the screen S2 is vertically offset by a distance Δh compared with its stored location, in accordance with an embodiment of the present invention.

FIG. 9 shows an extension of the functionality which is active if it is determined that the predicted path after exiting the first display area does intersect the second display area according to the second display area's stored physical location. (The extended functionality is therefore active in the opposite scenario to the functionality described above with reference to FIGS. 4 to 7 which is active when there is no intersection.) FIG. 9 shows display areas S1, S2 of two display screens arranged generally left and right of each other and the actual location of the screen S2 is vertically offset by a distance $\Delta h$ compared with its stored physical location. The reference numerals are the same as in previous figures. The user is aiming to move the cursor from its current position on screen S1 to a new position at point 29 on screen S2 marked by the cross. To do this, the user moves the cursor in a straight line towards the point 29, as perceived by the user from viewing the displays. However, at the moment when the cursor moves from screen S1 to the screen S2, it jumps vertically upwards by a distance $\Delta h$. This is because the stored physical location of screen S2 is below its actual location by the vertical offset distance $\Delta h$. The user therefore compensates for this by dragging the cursor down to meet the intended target point 29 on screen 2 as shown by the curved path 27.

The cursor control algorithm can detect the deviation of the cursor's movement in the direction of the traversed display edge from a linear extension of the path on the screen S1. For left-and-right arrangements as illustrated this is a vertical distance; effectively a plumb line intersecting point 29 from a linear extension of the path on screen S1. For screens, positioned above and below each other, the discontinuity would of course be a horizontal one. Moreover, as previously discussed, the extension need not be linear, but could be a higher-order interpolation. The screen S2 can then have its stored physical location adjusted by the size of the discontinuity, as measured by the deviation of the cursor's actual movement from its linear or otherwise interpolated path. The next time the user performs a similar action, the stored and actual locations of screens S2 should then correspond more closely, so that the jump or discontinuity as the cursor transitions from screen S1 to screen S2 is unnoticeably small to the user, or at least much reduced.

A refinement of this functionality is to make the size of the adjustment based on a weighted sum of recent S1 to S2 (and optionally also S2 to S1) cursor movements. For example, 3, 4, 5, 6, 7, 8, 9 or 10 such events could be included in the weighted sum. The weighting is linked to elapsed time either in real time or based on a counter that decrements with age eventually reaching zero, so that older off-display motion events are given a lower weighting. The weighted sum may also be restricted to include only events that have occurred in a current user session, and/or only consecutive inter-screen traversals that result in the predicted path after exiting the first display area intersecting the second display area according to the second display area's stored physical location.

For example, suppose that there have been 8 recent relevant inter-screen traversal motions and the software is configured only to take account of the last 4 using a decrementing counter, then the adjustment $\Delta H$ made to the stored location of screen S2 may be:

$$\Delta H = (4\Delta h_1 + 3\Delta h_2 + 2\Delta h_3 + 1\Delta h_4)/(4+3+2+1)$$

where $\Delta h_1$ represents the current deviation, $\Delta h_2$ the most recent previous deviation, and so forth. The weighted sum thus not only includes the deviation from the predicted path which is currently been considered, but also similar deviations from recent previous predicted paths. With the approach of using a weighted sum, the adjustment becomes an average taking account of multiple recent transitions so should result in smaller adjustments being made each time which converge on a matching between the actual and stored locations in the direction in line with the traversed edge, thereby avoiding jerkiness.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
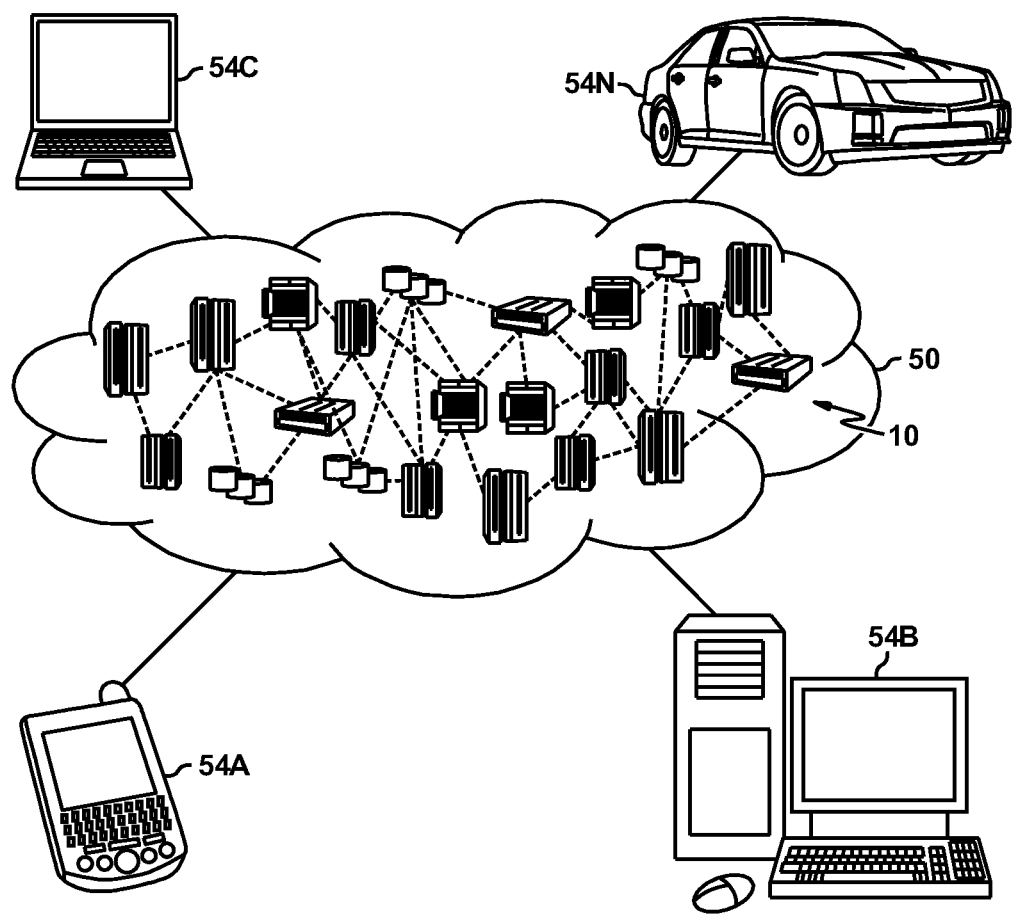
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
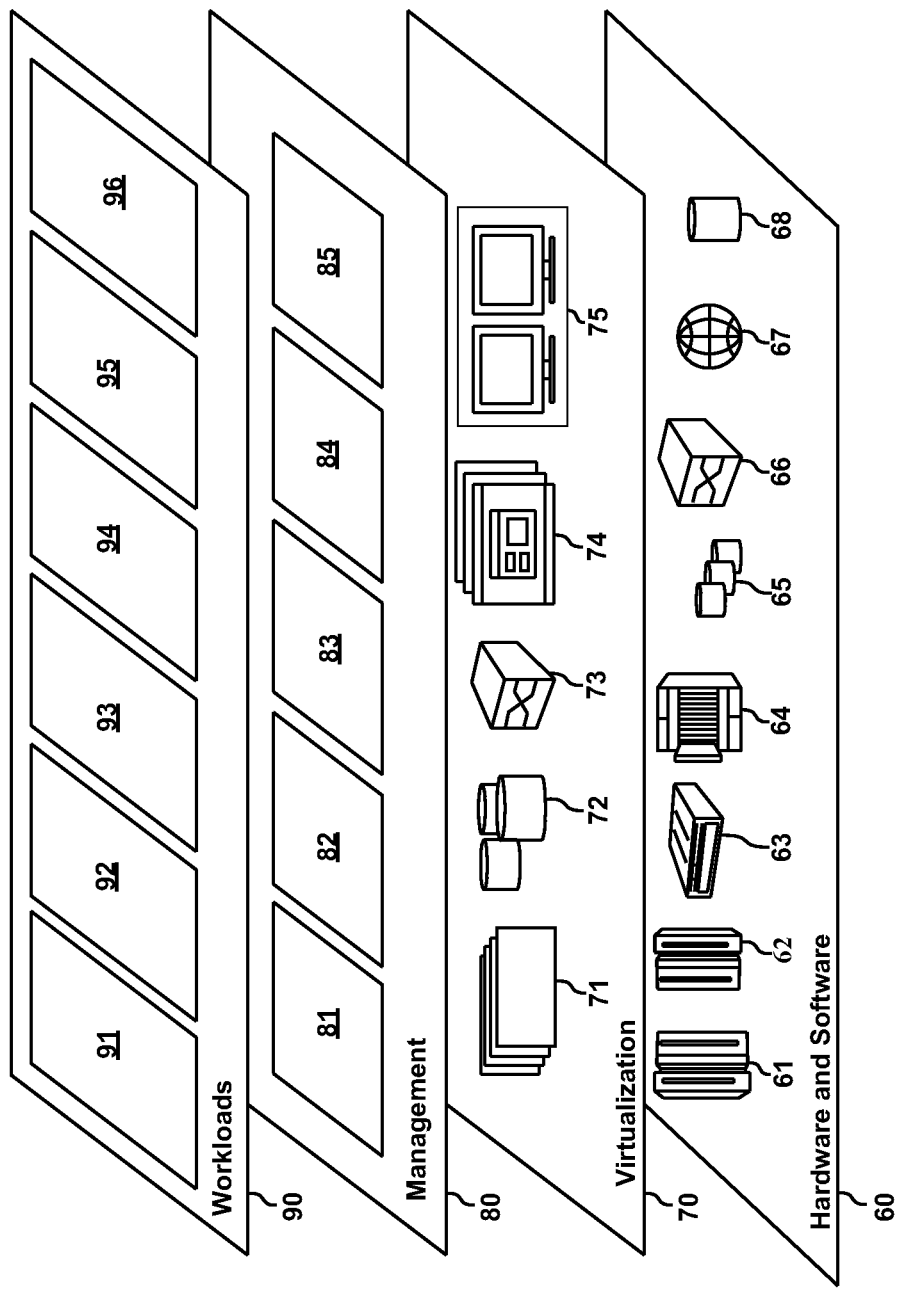
FIG. 11 depicts abstraction model layers according to an embodiment of the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software lifecycle management 92; virtual classroom education delivery 93; data analytics processing 94; transaction processing 95; and operating system control of a cursor 96 according to embodiments of the disclosure.

It will be clear to one skilled in the art that many improvements and modifications can be made to the foregoing exemplary embodiment without departing from the scope of the present disclosure.

What is claimed is:

1. A computer implemented method for controlling a display cursor in a computer connected to at least a first monitor and a second monitor having respective first and second display screens and display areas, wherein the respective first and second display areas are bounded by edges, and wherein the first monitor and the second monitor are configured in display settings of the computer to provide an extended display, the method comprising:
    displaying a cursor on the first display area, the cursor being under control of a user-controllable pointing device communicatively connected to the computer;
    sensing cursor location and speed of travel of the cursor within the first display area;
    detecting the sensed cursor location is moved to intersect an edge of the first display area;
    permitting the cursor to exit the first display area and enter the second display area conditional on the sensed cursor speed being above a threshold speed when the detected intersection occurred;
    storing, in the display settings of the computer, physical locations for the first and second display areas relative to each other;
    detecting that the sensed cursor location has moved to intersect the edge of the first display area with a sensed speed of travel of the cursor above the threshold speed;
    computing a predicted path for the cursor after it exits the first display area; and
    in response to determining that the predicted path for the cursor does intersect the second display area according to the second display area's stored physical location, displacing the stored physical location for the second display area in a direction of the intersected edge of the first display area by an amount derived from a deviation between the predicted path and an actual path of the cursor in the second display area in the direction of the intersected edge, wherein the amount is a weighted sum including a current deviation from the predicted path and one or more similar deviations from previous predicted paths, wherein a more recent above-threshold-speed edge intersection is weighted more than a less recent above-threshold-speed edge intersections.

2. The computer implemented method of claim 1, wherein the threshold speed has a value that varies according to the edge of the first display area being intersected.

3. The computer implemented method of claim 1, wherein the threshold speed has a value that varies according to which of a portion of the edge of the first display area is being intersected.

4. The computer implemented method of claim 1, wherein the threshold speed has a value that varies according to at least one of: past user motions of the cursor via the user-controllable pointing device; pointing device settings; and current applications running on the computer.

5. The computer implemented method of claim 1, wherein permitting the cursor to exit the first display area and enter the second display area is further conditional on the sensed cursor speed being below a maximum speed.

6. The computer implemented method of claim 1, wherein the sensed cursor speed is based on a component of velocity perpendicular to the edge of the first display area being intersected.

7. The computer implemented method of claim 1, further comprising:
    storing, in the display settings of the computer, physical locations for the first and second display areas relative to each other;
    computing a predicted path for the cursor after it exits the first display area when it is detected that the sensed cursor location has moved to intersect the edge of the first display area and the sensed speed of travel of the cursor is above the threshold speed; and
    altering the stored physical location for the second display area such that the predicted path intersects with the second display area if it is determined that the predicted path does not intersect the second display area according to the stored physical location for the second display area.

8. The computer implemented method of claim 7, wherein altering the stored physical location for the second display area comprises displacing the stored physical location for the second display area by a distance which is based on a minimum distance required to ensure that the predicted path intersects with the second display area.

9. The computer implemented method of claim 7, wherein the predicted path for the cursor after it exits the first display area is computed based on output of the user-controllable pointing device.

10. The computer implemented method of claim 7, wherein the predicted path for the cursor after it exits the first display area is computed based on an interpolation taken from a path of the cursor within the first display area prior to the intersection.

11. The computer implemented method of claim 7, further comprising:
    providing a third monitor connected to the computer, wherein the third monitor comprises a third display screen and a third display area, and wherein the third monitor is configured with the first and second monitors in display settings of the computer to provide an extended display;
    storing in the display settings of the computer a physical location for the third display area relative to the first and second display areas; and
    selecting one of the second and third display areas for moving based on which of the second and third display areas requires a smaller displacement to ensure that the predicted path for the cursor intersects with its respective display area in response to detecting that the sensed cursor location has moved to intersect an edge of the first display area with a sensed speed of travel of the cursor above the threshold speed and in response to determining, according to the stored physical locations for the first and second display areas, that the predicted path for the cursor intersects neither with the second display area nor with the third display area.

12. The computer implemented method of claim 7, wherein the stored physical locations for the first and second display areas are restricted to be to the left or to the right of each other.

13. A computer program product for controlling a display cursor in a computer connected to at least a first monitor and a second monitor having respective first and second display screens and display areas, wherein the respective first and second display areas are bounded by edges, and wherein the first monitor and the second monitor are configured in display settings of the computer to provide an extended display, the computer program product comprising:
one or more computer-readable tangible storage devices and program instructions stored on at least one of the one or more tangible storage devices, the program instructions comprising:
program instructions to display a cursor on the first display area, the cursor being under control of a user-controllable pointing device communicatively connected to the computer;
program instructions to sense cursor location and speed of travel of the cursor within the first display area;
program instructions to detect the sensed cursor location is moved to intersect an edge of the first display area;
program instructions to permit the cursor to exit the first display area and enter the second display area conditional on the sensed cursor speed being above a threshold speed when the detected intersection occurred;
program instructions to store, in the display settings of the computer, physical locations for the first and second display areas relative to each other;
program instructions to detect that the sensed cursor location has moved to intersect the edge of the first display area with a sensed speed of travel of the cursor above the threshold speed;
program instructions to compute a predicted path for the cursor after it exits the first display area; and
in response to determining that the predicted path for the cursor does intersect the second display area according to the second display area's stored physical location, program instructions to displace the stored physical location for the second display area in a direction of the intersected edge of the first display area by an amount derived from a deviation between the predicted path and an actual path of the cursor in the second display area in the direction of the intersected edge, wherein the amount is a weighted sum including a current deviation from the predicted path and one or more similar deviations from previous predicted paths, wherein a more recent above-threshold-speed edge intersection is weighted more than a less recent above-threshold-speed edge intersections.

14. The computer program product of claim 13, further comprising:
program instructions to alter the stored physical location for the second display area such that the predicted path intersects with the second display area if it is determined that the predicted path does not intersect the second display area according to the stored physical location for the second display area.

15. The computer program product of claim 14, further comprising:
program instructions to provide for a third monitor connected to the computer, wherein the third monitor comprises a third display screen and a third display area, and wherein the third monitor is configured with the first and second monitors in display settings of the computer to provide an extended display;
program instructions to store, in the display settings of the computer, a physical location for the third display area relative to the first and second display areas; and
program instructions to select one of the second and third display areas for moving based on which of the second and third display areas requires a smaller displacement to ensure that the predicted path for the cursor intersects with its respective display area in response to detecting that the sensed cursor location has moved to intersect an edge of the first display area with a sensed speed of travel of the cursor above the threshold speed and in response to determining, according to the stored physical locations for the first and second display areas, that the predicted path for the cursor intersects neither with the second display area nor with the third display area.

16. A computer system for controlling a display cursor in a computer connected to at least a first monitor and a second monitor having respective first and second display screens and display areas, wherein the respective first and second display areas are bounded by edges, and wherein the first monitor and the second monitor are configured in display settings of the computer to provide an extended display, the computer system comprising:
one or more processors, one or more computer-readable memories, one or more computer-readable tangible storage devices, and program instructions stored on at least one of the one or more storage devices for execution by at least of the one or more processors via at least one of the one or more memories, the program instructions comprising:
program instructions to display a cursor on the first display area, the cursor being under control of a user-controllable pointing device communicatively connected to the computer;
program instructions to sense cursor location and speed of travel of the cursor within the first display area;
program instructions to detect the sensed cursor location is moved to intersect an edge of the first display area;
program instructions to permit the cursor to exit the first display area and enter the second display area conditional on the sensed cursor speed being above a threshold speed when the detected intersection occurred;
program instructions to store, in the display settings of the computer, physical locations for the first and second display areas relative to each other;
program instructions to detect that the sensed cursor location has moved to intersect the edge of the first display area with a sensed speed of travel of the cursor above the threshold speed;
program instructions to compute a predicted path for the cursor after it exits the first display area; and
in response to determining that the predicted path for the cursor does intersect the second display area according to the second display area's stored physical location, program instructions to displace the stored physical location for the second display area in a direction of the intersected edge of the first display area by an amount derived from a deviation between the predicted path and an actual path of the cursor in the second display area in the direction of the intersected edge, wherein the amount is a weighted sum including a current deviation from the predicted path and one or more similar deviations from previous predicted paths, wherein a more recent above-threshold-speed edge intersection is weighted more than a less recent above-threshold-speed edge intersections.

17. The computer system of claim 16, the computer system further comprising:
program instructions to alter the stored physical location for the second display area such that the predicted path intersects with the second display area if it is determined that the predicted path does not intersect the second display area according to the stored physical location for the second display area.

18. The computer system of claim 17, the computer system further comprising:
program instructions to provide for a third monitor connected to the computer, wherein the third monitor comprises a third display screen and a third display area, and wherein the third monitor is configured with the first and second monitors in display settings of the computer to provide an extended display;
program instructions to store, in the display settings of the computer, a physical location for the third display area relative to the first and second display areas; and
program instructions to select one of the second and third display areas for moving based on which of the second and third display areas requires a smaller displacement to ensure that the predicted path for the cursor intersects with its respective display area in response to detecting that the sensed cursor location has moved to intersect an edge of the first display area with a sensed speed of travel of the cursor above the threshold speed and in response to determining, according to the stored physical locations for the first and second display areas, that the predicted path for the cursor intersects neither with the second display area nor with the third display area.

* * * * *